(12) United States Patent
Moorthy et al.

(10) Patent No.: US 11,729,109 B2
(45) Date of Patent: *Aug. 15, 2023

(54) EXCESS BITRATE DISTRIBUTION BASED ON QUALITY GAIN IN SABR SERVER

(71) Applicant: ARRIS Enterprises LLC, Suwanee, GA (US)

(72) Inventors: Praveen N. Moorthy, San Diego, CA (US); Mark S. Schmidt, San Diego, CA (US); Baozhou Li, San Diego, CA (US); Ajay Luthra, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/882,385

(22) Filed: Aug. 5, 2022

(65) Prior Publication Data
US 2022/0385955 A1 Dec. 1, 2022

Related U.S. Application Data

(63) Continuation of application No. 15/915,827, filed on Mar. 8, 2018, now Pat. No. 11,444,887.
(Continued)

(51) Int. Cl.
*G06F 15/173* (2006.01)
*H04L 47/70* (2022.01)
(Continued)

(52) U.S. Cl.
CPC .............. *H04L 47/70* (2013.01); *H04L 65/61* (2022.05); *H04L 65/80* (2013.01); *H04L 67/02* (2013.01);
(Continued)

(58) Field of Classification Search
CPC ..... H04L 65/4069; H04L 65/50; H04L 67/02; H04N 21/234345; H04N 21/23439;
(Continued)

(56) References Cited

U.S. PATENT DOCUMENTS 5,861,919 A 1/1999 Perkins et al.
8,910,229 B2 12/2014 Xu et al.
(Continued)

OTHER PUBLICATIONS

PCT Invitation to Pay Additional Fees (Form ISA/206), Re: Application No. PCT/US2018/021631, dated May 9, 2018.
(Continued)

*Primary Examiner* — Hannah S Wang
(74) *Attorney, Agent, or Firm* — Chernoff, Vilhauer, McClung & Stenzel, LLP

(57) ABSTRACT

A method provides for delivering video content from a server to a plurality of media devices is disclosed that distributes accurately excess bandwidth. The method includes: determining, by the server, the bandwidth to allocate to each of the plurality of media devices using a hypertext transfer protocol-based live streaming client model or a need parameter vector and/or measured bandwidth limitations associated with each of the plurality of media devices and providing the allocated bandwidth to each of the plurality of media devices, wherein the video content is transmitted in a plurality of segments from the server, and wherein each segment is transmitted at a bitrate that may vary from segment to segment.

20 Claims, 13 Drawing Sheets

Related U.S. Application Data

(60) Provisional application No. 62/468,583, filed on Mar. 8, 2017.

(51) Int. Cl.

| | | |
|---|---|---|
| *H04N 21/2343* | (2011.01) | |
| *H04N 21/24* | (2011.01) | |
| *H04N 21/845* | (2011.01) | |
| *H04N 21/262* | (2011.01) | |
| *H04N 21/2365* | (2011.01) | |
| *H04N 21/2662* | (2011.01) | |
| *H04L 65/80* | (2022.01) | |
| *H04L 65/61* | (2022.01) | |
| *H04N 21/2187* | (2011.01) | |
| *H04N 21/2385* | (2011.01) | |
| *H04N 21/647* | (2011.01) | |
| *H04L 67/02* | (2022.01) | |
| *H04N 21/442* | (2011.01) | |
| *H04N 21/6332* | (2011.01) | |
| *H04L 67/303* | (2022.01) | |
| *H04L 5/00* | (2006.01) | |
| *H04L 47/783* | (2022.01) | |
| *H04L 67/101* | (2022.01) | |
| *H04L 65/75* | (2022.01) | |

(52) U.S. Cl.
CPC ..... *H04N 21/2187* (2013.01); *H04N 21/2385* (2013.01); *H04N 21/23439* (2013.01); *H04N 21/23655* (2013.01); *H04N 21/234345* (2013.01); *H04N 21/2401* (2013.01); *H04N 21/2402* (2013.01); *H04N 21/2662* (2013.01); *H04N 21/26216* (2013.01); *H04N 21/26258* (2013.01); *H04N 21/44227* (2013.01); *H04N 21/6332* (2013.01); *H04N 21/64738* (2013.01); *H04N 21/8456* (2013.01); *H04L 5/0064* (2013.01); *H04L 5/0085* (2013.01); *H04L 5/0087* (2013.01); *H04L 47/787* (2013.01); *H04L 65/762* (2022.05); *H04L 67/101* (2013.01); *H04L 67/303* (2013.01)

(58) Field of Classification Search
CPC ......... H04N 21/23655; H04N 21/2401; H04N 21/2402; H04N 21/26216; H04N 21/26258; H04N 21/2662; H04N 21/44227; H04N 21/6332; H04N 21/8456
USPC ........................................................ 709/226
See application file for complete search history.

(56) References Cited

U.S. PATENT DOCUMENTS

| | | |
|---|---|---|
| 9,083,581 B1 | 7/2015 | Addepalli et al. |
| 9,769,235 B2 | 9/2017 | Schmidt et al. |
| 9,784,887 B1 | 10/2017 | Ulmer et al. |
| 2010/0067584 A1 | 3/2010 | Mitasaki et al. |
| 2010/0329332 A1 | 12/2010 | Zhang et al. |
| 2012/0110609 A1 | 5/2012 | Guo et al. |
| 2013/0326024 A1 | 12/2013 | Chen et al. |
| 2014/0013376 A1 | 1/2014 | Xu et al. |
| 2015/0074285 A1 | 3/2015 | Gahm et al. |
| 2015/0341705 A1 | 11/2015 | Rauhe et al. |
| 2015/0381690 A1 | 12/2015 | Schmidt et al. |
| 2016/0007050 A1 | 1/2016 | Rusert et al. |
| 2016/0050246 A1 | 2/2016 | Liao et al. |
| 2016/0205164 A1 | 7/2016 | Schmidt et al. |
| 2018/0027039 A1 | 1/2018 | Moorthy et al. |
| 2018/0262813 A1 | 9/2018 | Moorthy et al. |

OTHER PUBLICATIONS

PCT Search Report & Written Opinion, Re: Application No. PCT/US2018/021631, dated Jul. 2, 2018.

EXCESS BITRATE DISTRIBUTION BASED ON QUALITY GAIN IN SABR SERVER

CROSS REFERENCE TO RELATED APPLICATIONS

This Application is a continuation of U.S. patent application Ser. No. 15/915,827, filed Mar. 8, 2018, which claims priority under 35 U.S.C. § 119(e) from earlier filed U.S. Provisional Application Ser. No. 62/468,583, filed Mar. 8, 2017, the entirety of which is hereby incorporated herein by reference.

BACKGROUND

Technical Field

The present application relates general to the field of bandwidth management and more specifically to the field of bandwidth allocation based, at least in part, on measured throughput.

Related Art

Streaming of media over a network from a content server to a media device has been widely adopted for media consumption. Two network protocols used for media streaming include the user datagram protocol Internet protocol ("UDP IP") and the transfer control protocol ("TCP") IP. UDP IP is often used for media streaming for relatively reliable networks, such as in-home streaming over wired connections. TCP IP is often used for streaming over less reliable networks.

The hypertext transfer protocol ("HTTP") based live streaming ("HLS") protocol, used with the TCP IP, allows a content server to publish variant playlist files to media devices. A variant playlist file identifies multiple sets of video streams for a media program, such as a movie, a television program, etc., where each set of video streams has unique encoding parameters (e.g., bit rates, resolutions, etc.) for the media program. The media devices may dynamically switch between the sets of video streams identified in the variant playlist file as the sets of video streams are transmitted from the content server to the media devices. The media devices may choose to receive an initial set of video streams identified in the variant playlist file based on initial network conditions, initial buffer conditions, etc. For example, the media devices may choose to receive a set of high definition ("HD") video streams identified in the variant playlist file if the initial network conditions, the initial buffer conditions, etc., support the streaming of the HD set of video streams. If the initial network conditions degrade, or if the initial buffer conditions degrade, etc., then the media devices may choose to receive a set of low definition video streams identified in the variant playlist file. That is, the media device may dynamically choose different sets of video streams to receive from the content server where the different sets of video streams have different encoding parameters.

Selection and transmission of the sets of video streams are driven by the media devices. In response to a selection of a set of video streams identified in the variant playlist file, the content server passively transmits the set of video streams to the media device. The media device may have limited information about the network conditions and might not select a set of video streams that is suitable for the current network conditions. Further, some types of media devices select the highest resolution and highest bit rate sets of video streams to receive. Typically the content server services multiple media devices, transmitting multiple sets of video streams to the media devices. If a media device requests a set of video streams with high resolution and high bit rate, a large portion of content server resources or network bandwidth may have to be allocated in order to service that media device. Consequently, the other media devices serviced by the content server may experience degraded performance such as intermittent interruptions in the transmission of video streams.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect can include measuring a bandwidth constraint associated with users' home network devices. The method can also include determining, by a server, bandwidth to allocate to each of a plurality of media devices configured to provide video content using a hypertext transfer protocol-based live streaming client model ("hcm") and a bitrate based, at least in part on a corresponding need parameter vector ("npv") varied by a scalar quality value for each of the plurality of media devices and on said measured bandwidth constraint associated with said users' home network devices. And can further include providing the determined bandwidth to allocate to each of the plurality of media devices. The method can also include a step where the video content is transmitted in a plurality of segments from the server. In some embodiments, the method can include a step where each segment is transmitted using a variable bitrate from segment to segment. Other embodiments of this aspect include corresponding computer systems, apparatus, and computer programs recorded on one or more computer storage devices, each configured to perform the actions of the methods.

Implementations may include one or more of the following features. The method where the server constructs a state-based hcm for each of the plurality of media devices. The method where the hcm provides if a media device is in a buffering state or playback state. The method where the hcm provides an estimate of a fullness of a media-device buffer. The method where the determined bandwidth to allocate to each of the plurality of media devices prevents a media device from buffering content already received from the server. The method where the server or a proxy constructs a npv for each of the plurality of media devices. The method where the npv is based on one or more of the following: video complexity, device profile, service priority level, and codec profile. The method where the video complexity is derived from video content as an estimation of complexity of the video content. The method where the npv is computed based on a complexity of video content for each segment. The method where the npv has a linear relationship with the bitrate for a given segment. The method further including: transmitting the video content from the server to one or more media devices at a bit rate that is within the confines of the determined bandwidth to allocate for each media device. Implementations of the described techniques may include hardware, a method or process, or computer software on a computer-accessible medium.

One general aspect can include a method for providing video content using a hypertext transfer protocol-based live streaming client model ("hcm"), the method comprising: determining a bandwidth to allocate to a plurality of media devices. The method can also include determining bandwidth constraints associated with each of said plurality of media devices. The method can further include determining a number of active media devices associated with the plurality of media devices to allocate the determined bandwidth. And can include determining a need parameter vector ("npv") for each of the active media devices. The method also includes assigning a fraction of the bandwidth to each of the active media devices based, at least in part, on said bandwidth constraints associated with each of said plurality of media devices and on the npv varied by a scalar quality value for each of the active media devices. Other embodiments of this aspect include corresponding computer systems, apparatus, and computer programs recorded on one or more computer storage devices, each configured to perform the actions of the methods.

Implementations can further include one or more of the following features. The method where the npv is based or one or more of the following: video complexity, device profile, service priority level, and codec profile. The method where video complexity is derived from video content as an estimation of a complexity of the video content. The method where the npv is based on device profile. The method where the device profile indicates that an active device is undergoing a transition period requiring a modification to the bandwidth assigned to the active device. The method where the transition period is one or more of the following: a channel change, a pause or resume, a seek, a complete, and a join. The method where the npv is computed based on a complexity of video content for each segment. The method further including: determining an adjustment factor for assigning the fraction of the total bandwidth to each active media device. The method where the adjustment factor is based on or more of the following: the npv for an active media device is over budget, the npv for an active media device is under budget, an active media device completes playback, and a bottleneck occurs at the active media device. Implementations of the described techniques may include hardware, a method or process, or computer software on a computer-accessible medium.

One other general aspect includes a server configured to provide video content, the server including: a set of processors; and a computer-readable storage medium including instructions for controlling the set of processors to be configured for. The server can also perform a step of determining bandwidth to allocate to each of a plurality of media devices using a hypertext transfer protocol-based live streaming client model ("hcm") and a bitrate based, at least in part, on measured bandwidth constraints associated with each of the plurality of media devices and on a corresponding need parameter vector ("npv") varied by a scalar quality value for each of the plurality of media devices. The server can further perform the step of providing the determined bandwidth to allocate to each of the plurality of media devices, where the video content is transmitted in a plurality of segments from the server and where each segment is transmitted using a variable bitrate from segment to segment.

Other embodiments of this aspect include corresponding computer systems, apparatus, and computer programs recorded on one or more computer storage devices, each configured to perform the actions of the methods.

BRIEF DESCRIPTION OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1A:
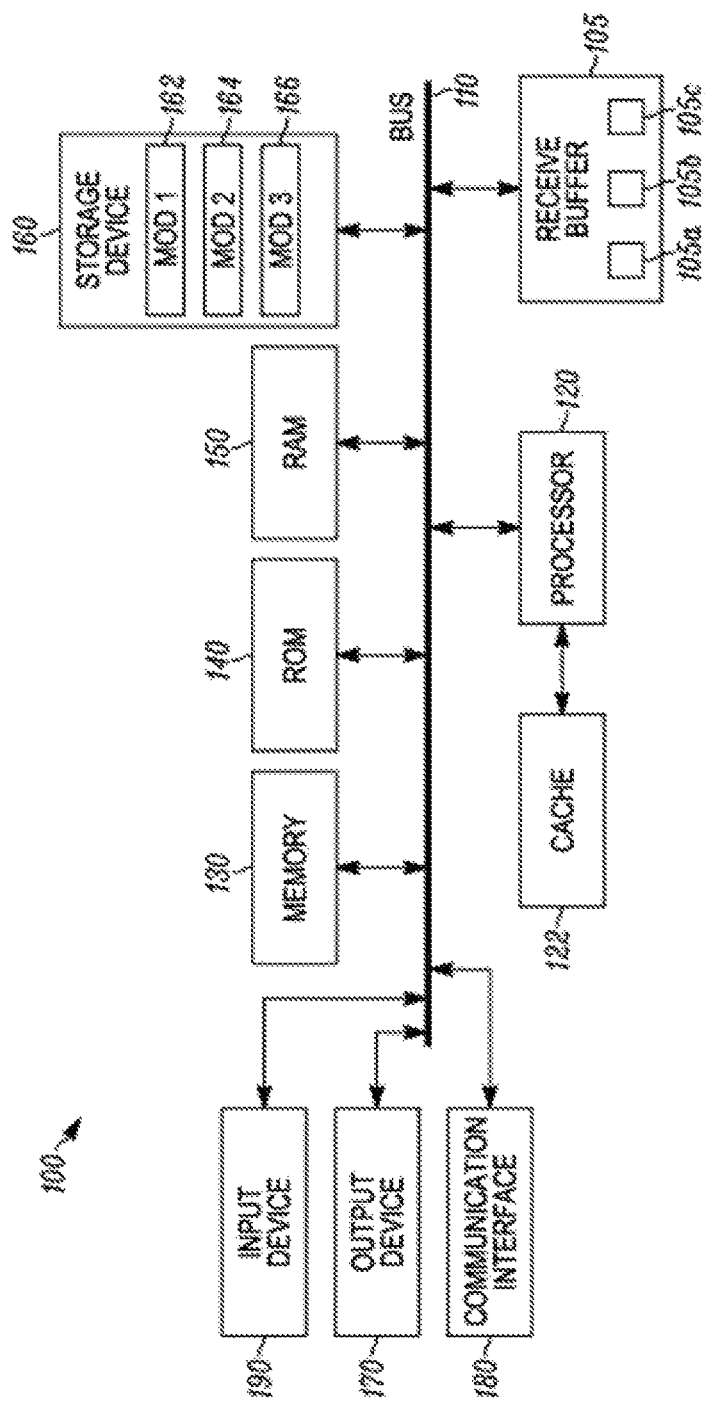
FIG. 1A illustrates an example system implementation in which embodiments of the disclosure may be used.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

With reference to FIG. 1A, an example media device 100 includes a processing unit 120 and a system bus 110 that couples various system components including the system memory 130 such as read-only memory ("ROM") 140 and random-access memory ("RAM") 150 to the processor 120. The media device 100 can include a cache 122 of high-speed memory connected directly with, in close proximity to, or integrated as part of the processor 120. The media device 100 may be configured to copy data from the memory 130 or a storage device 160 to the cache 122 for quick access by the processor 120. In this way, the cache 122 provides a performance boost that avoids processor delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a media device 100 with more than one processor 120 or on a group or cluster of computing devices networked together to provide greater processing capability. The processor 120 can include any general-purpose processor and a hardware module or software module, such as module 1 162, module 2 164, and module 3 166 stored in the storage device 160 and configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output system stored in ROM 140 or the like may provide the basic routine that helps to transfer information between elements within the media device 100, such as during start-up. The media device 100 further includes storage devices 160, such as a hard disk drive, a magnetic disk drive, an optical disk drive, tape drive, or the like. The storage device 160 is connected to the system bus 110 by a drive interface. The drives and the associated computer-readable storage media provide non-volatile storage of computer-readable instructions, data structures, program modules, and other data for the media device 100. In some embodiments, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, a computer server, or the like.

Although some implementations employ the hard disk 160, it should be appreciated by those skilled in the art that other types of computer-readable media which can store data that are accessible by a computer, such as magnetic cassettes, flash memory cards, digital versatile disks, cartridges, RAM 150, ROM 140, a cable or wireless signal containing a bit stream and the like, may also be used in the exemplary operating environment. Non-transitory computer-readable storage media expressly exclude media such as energy, carrier signals, electromagnetic waves, and signals per se.

Media device 100 also includes a receive buffer 105 that includes three buffer sections 105 *a*, 105 *b*, and 105 *c*. A first buffer section 105 *a* may be for video packets that media device 100 has received from a content server but has not consumed for media play. Media device 100 may have acknowledged receipt of the video packets in the first buffer section 105 *a* to the content server via an acknowledgment. A buffer management module (not shown) may monitor the rate at which video packets in the first buffer section 105 *a* are retrieved for consumption by media device 100.

A second buffer section 105 *b* may be for video packets that media device 100 has received from a content server but has not consumed for media play. Media device 100 may not have sent acknowledgments to the content server for the video packets in the second buffer section 105 *b*. Portions of the second buffer section 105 *b* may be categorized as a portion of the first buffer section 105 *a* as acknowledgments for video packets in the second buffer section 105 *b* are transmitted to the content server from media device 100. A buffer management module (not shown) may track the portions of the second buffer section 105 *b* that are categorized as a portion of the first video buffer 105 *a* when media device 100 sends an acknowledgment to the content server for acknowledging receipt of the video packets in the second buffer section 105 *b*.

A third buffer section 105 *c* may be available for receipt of video packets. A buffer management module (not shown) may monitor the third buffer section 105 *c* to determine when the third buffer section 105 *c* receives video packets and is categorized as a portion of the second buffer section 105 *b*. Portions of the first buffer section 105 *a* may be categorized as a portion of the third buffer section 105 *c* as video packets from the first buffer section 105 *a* are consumed. That is, the portion of the first buffer section 105 *a* for which video packets are consumed may receive new video packets from the content server.

The sizes of the first, second, and third buffer sections 105 *a*-105 *c* together define the maximum buffer size for video-packet buffering according to some embodiments. The maximum buffer size may be allocated by the media device 100 when opening an initial connection with a content server. The maximum buffer size typically remains unchanged after the allocation.

To enable user interaction with the media device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the media device 100. The communications interface 180 generally governs and manages the user input and system output. There is no restriction on operating on any particular hardware arrangement, and therefore the basic features here may easily be substituted for improved hardware or firmware arrangements as they are developed.

For clarity of explanation, the illustrative system embodiment is presented as including individual functional blocks, including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as equivalent to software executing on a general-purpose processor. For example the functions of one or more processors presented in FIG. 1A may be provided by a single shared processor or multiple processors. Illustrative embodiments may include microprocessor or digital signal processor ("DSP") hardware, ROM 140 for storing software performing the operations discussed below, and RAM 150 for storing results. Very large scale integration ("VLSI") hardware embodiments, as well as custom VLSI circuitry, in combination with a general purpose DSP circuit, may also be provided.

The logical operations of the various embodiments may be implemented as: (1) a sequence of computer-implemented steps, operations, or procedures (generally "instructions") running on a programmable circuit within a general-use computer, (2) a sequence of computer-implemented steps, operations, or procedures running on a specific-use programmable circuit, or (3) interconnected machine modules or program engines within the programmable circuits. The media device 100 shown in FIG. 1A can practice all or part of the disclosed methods, or can be a part of the disclosed systems, or can operate according to instructions in the disclosed computer-readable storage media. Such logical operations can be implemented as modules configured to control the processor 120 to perform particular functions according to the programming of the module. For example, FIG. 1A illustrates three modules Mod1 162, Mod2 164, and Mod3 166 which are modules configured to control the processor 120. These modules may be stored on the storage device 160 and loaded into RAM 150 or memory 130 at runtime or may be stored as would be known in the art in other computer-readable memory locations.

Content delivery describes the delivery of media "content" such as audio or video or computer software and games over a delivery medium such as broadcasting or the Internet. Content delivery generally has two parts: delivery of finished content for digital distribution, with its accompanying metadata; and delivery of the end product to an end-user.

As used herein, "streaming media" are media received by and presented to an end-user while being delivered by a streaming provider using Adaptive Bit Rate ("ABR") streaming methods. The name refers to the delivery method of the medium rather than to the medium itself. The distinction is usually applied to media that are distributed over telecommunications networks, e.g., "on-line," as most other delivery systems are either inherently streaming (e.g., radio, television) or inherently non-streaming (e.g., books, video cassettes, audio CDs). Hereinafter, on-line media and on-line streaming using ABR methods are referred to as "media" and "streaming."

ABR streaming is a technology that works by breaking the overall media stream or media file into a sequence of small HTTP-based file downloads, each download loading one short segment of an overall potentially unbounded transport stream or media elementary streams. As the stream is played, the client (e.g., the media player) may select from a number of different alternate streams containing the same material encoded at a variety of data rates, allowing the streaming session to adapt to the available data rate. At the start of the streaming session, the player downloads a manifest containing the metadata for the various sub-streams which are available. Since its requests use only standard HTTP transactions, ABR streaming is capable of traversing a firewall or proxy server that lets through standard HTTP traffic, unlike UDP-based protocols such as Real-Time Transport Protocol. This also allows a content delivery network to readily be implemented for any given stream. ABR-streaming methods have been implemented in proprietary formats including HTTP Live Streaming by Apple, Inc., and HTTP Smooth Streaming by Microsoft, Inc. ABR streaming has been standardized as ISO/IEC 23009-1, Information Technology—Dynamic adaptive streaming over HTTP: Part 1: Media presentation description and segment formats.

An increasing number of video playback devices, such as the Apple iPad, prefer video content to be delivered via ABR streaming rather than streamed continuously. The iPad, using Apple's HTTP Live Streaming format, receives the manifest as an m3u8 file that contains links, media uniform resource identifiers (URIs), to each of the segments or "chunks" of video content, and processes the manifest file to retrieve and play back each media segment in turn. In this disclosure, "HLS" represents the range of protocols that segment media content and employ a playlist to manage playback.

Figure 1B:
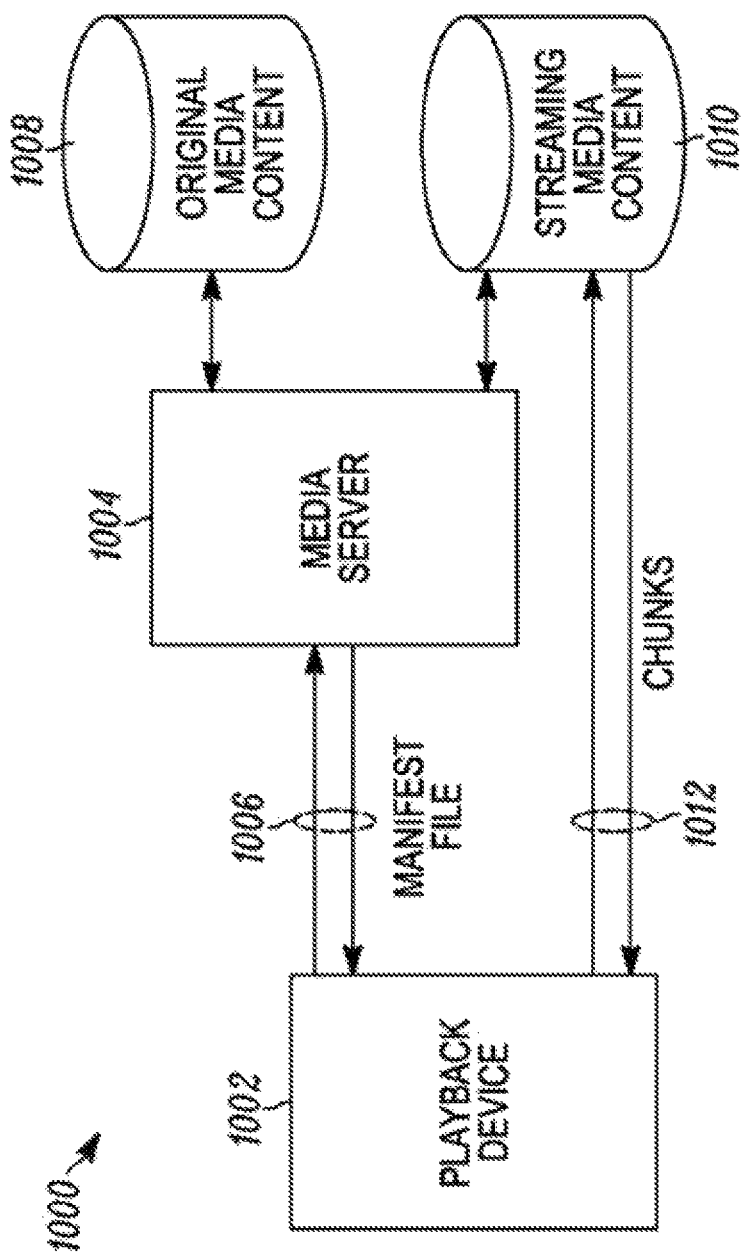
FIG. 1B illustrates an example media-streaming system implementation in which embodiments of the disclosure may be used.

Having disclosed some components of a computing system, the disclosure now turns to FIG. 1B, which illustrates an example media-streaming system embodiment 1000. The communications between the entities depicted in FIG. 1B can occur via one or more wired or wireless networks. Further, the devices can communicate directly, via the World Wide Web, or via an application-programming interface. A playback device 1002, such as a tablet device, smartphone, desktop or portable computer, set-top box, Internet-enabled television, media center PC, or any other suitable device, first makes a request to a media server 1004 for playback of media content. Typically, the media server 1004 resides in a network, such as the Internet or a third-party content-distribution network.

In HLS, the media server 1004 receives the request and generates or fetches a manifest file 1006 to send to the media device 1002 in response to the request. Example formats for the manifest file 1006 include the m3u and m3u8 formats. An m3u8 file is a specific variation of an m3u encoded using UTF-8 Unicode characters. The m3u file format was initially used in the WINAMP Media Player for audio-only files but has since become a de facto playlist standard on many media devices for local or streaming media, including music and other media types. Many media devices employ variations of the m3u file format, any of which can be used according to the present disclosure. A manifest file can include links to media files as relative or absolute paths to a location on a local file system or as a network address, such as a URI path. The m3u8 format is used herein as a non-limiting example to illustrate the principles of manifest files including non-standard variants.

The manifest file 1006 includes a list of Uniform Resource Locators ("URLs") to different representations of the requested segmented media content. Before or at the time of the request, the media server 1004 generates or identifies the media segments of the requested media content as streaming media content 1010. The media segments of the streaming media content 1010 are generated, either by the media server 1004, by the content producer, or by some other entity, by splitting, transcoding, or transrating the original media content 1008. Upon receiving the manifest file 1006, the media device 1002 can fetch a first media segment for playback from the streaming media content 1010, then, during playback of that media segment, fetch a next media segment for playback after the first media segment, and so on until the end of the media content.

Figure 2:
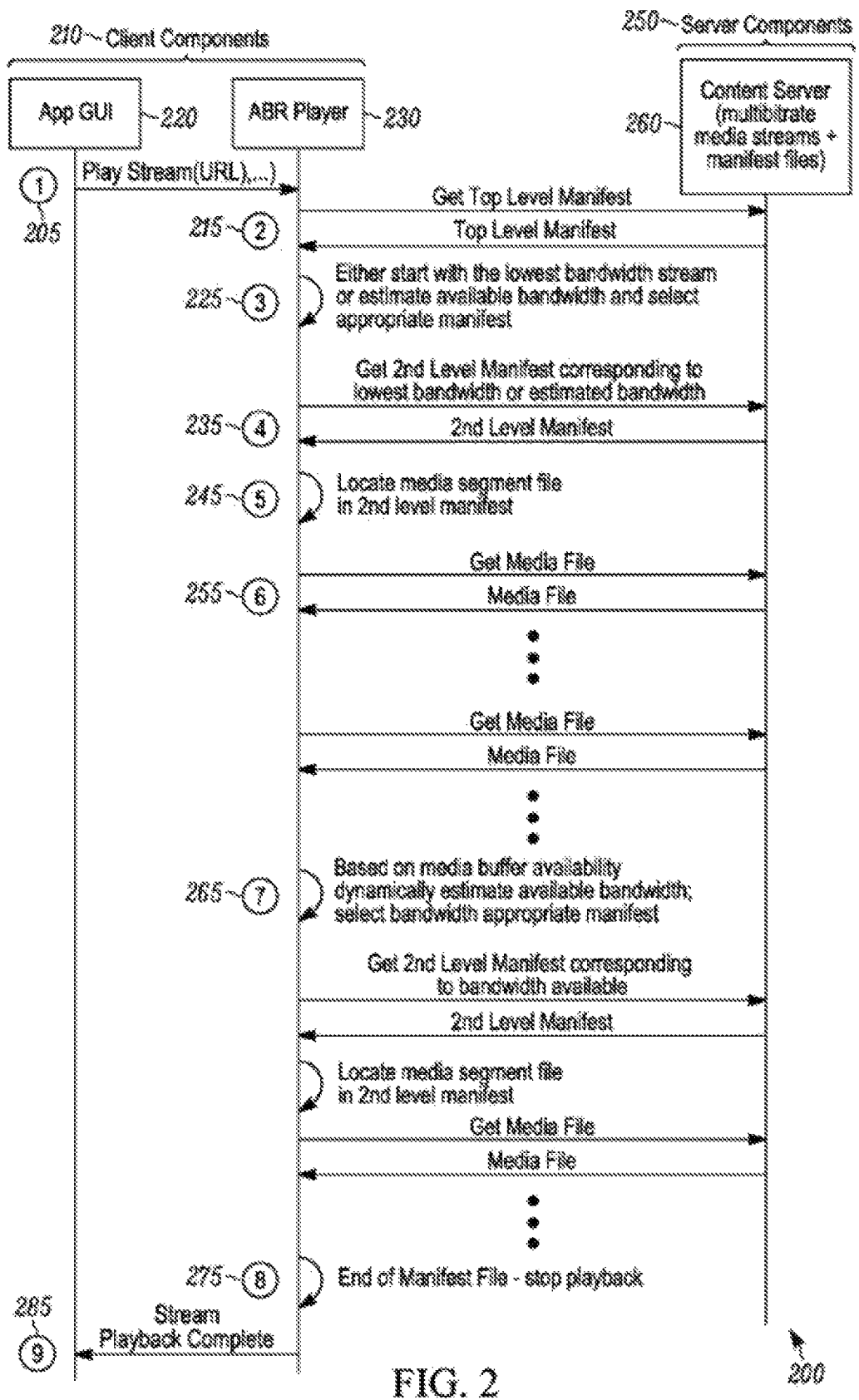
FIG. 2 illustrates a system that includes client components and server components in communication with each other and the message flows for typical adaptive streaming in accordance with embodiments of the disclosure.

Referring to FIG. 2, a system 200 is shown that includes client components 210 and server components 250 in communication with each other and the message flows for typical adaptive streaming. Flows related to security between the client components 210 and server components 250 have been omitted for clarity.

Client components 210 may include an application graphic user interface ("App GUI") 220 and ABR player 230. Server components 250 may include a content server 260, which may be configured to store or produce multi-bitrate media steams and manifest files.

In a first step 205, a user navigates through movie listing and selects an audiovisual media asset for viewing. In some embodiments, the audiovisual media asset is linked to a URL pointing to a high-level playlist.

In a next step 215, the ABR player 230 requests a high-level manifest file for the audiovisual media asset that includes information about the ABR profiles and links to the manifests corresponding to each media bandwidth.

In a next step 225, the ABR player 230 looks at the high-level manifest or master playlist and either starts by requesting the first manifest file, the lowest bandwidth manifest file, or optionally may do some bandwidth availability estimation and select the corresponding bandwidth manifest file.

In a next step 235, ABR player 230 requests a 2nd-level manifest for the corresponding bandwidth. In a next step 245, ABR player 230 determines the media segment file in the 2nd-level manifest.

In a next step 255, ABR player 230 requests media segment files in succession. In a next step 265, ABR player 230 continuously monitors the media buffer fullness to determine if it is necessary to request lower or higher bandwidth media-segment representations. For example, if the bandwidth conditions change, the player selects the corresponding bandwidth manifest file and selects media segments in succession.

In a next step 275, when the end of the manifest file is reached, ABR player 230 signals the App GUI 220 that playback of the audiovisual media asset is complete. The signaling that the stream playback is complete is shown as step 285.

As explained above, the content server 260 services multiple media devices or ABR players 230, transmitting multiple sets of video streams to the media devices. If a media device requests a set of video streams with high resolution and high bit rate, a large portion of content-server resources or network bandwidth may have to be allocated in order to service that media device. Consequently, the other media devices serviced by the content server may experience degraded performance such as intermittent interruptions in the transmission of video streams.

Consequently, a server-side approach that is able to efficiently utilize multiplexing techniques with ABR streaming for multiple clients is highly desirable. For example, a system and method that can determine the resources to allocate to each client, e.g., by not giving the client multiple options, while maximizing the performance for each client, offers many advantages over the current client-driven model.

Figure 3A:
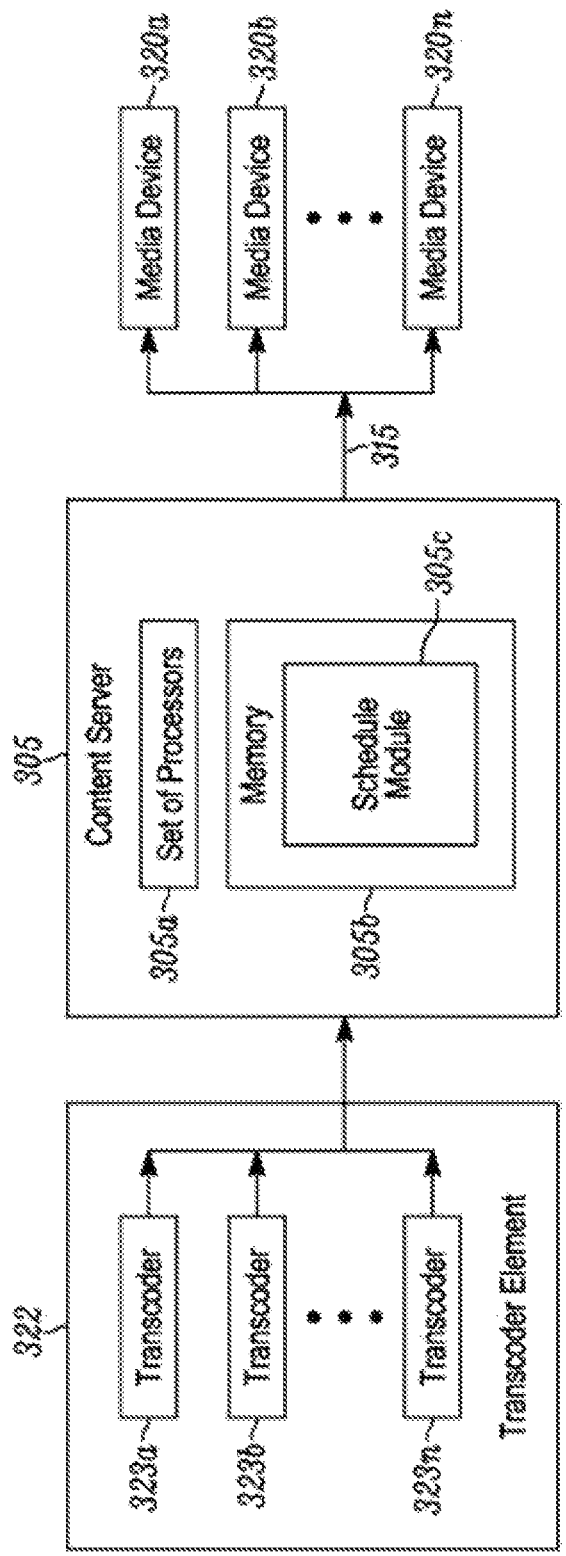
FIG. 3A illustrates a video streaming system in accordance with embodiments of the disclosure.

FIG. 3A depicts a video streaming system 300 according to some embodiments. Video streaming system 300 includes a content server 305, a network 315, a set of media devices 320, and a transcoder element 322. Content server 305 may transmit video content or sets of video streams to media devices 320 via network 315. A set of video streams may be for a media program, such as a movie, a television program, etc. Each video stream in a set of video streams may be a short segment of video (e.g., two second, ten seconds, etc.). A set of video streams may include thousands of video streams for a media program, such as a two-hour movie. As used herein, encoded content such as video transport or elementary stream may be divided into fixed-duration segments (e.g., chunks). The segments or chunks are typically between two and 10 seconds in duration, although they may be longer or shorter. In some embodiments, shorter segments reduce coding efficiency while larger segments impact speed to adapt to changes in network throughput. In some embodiments, the video and audio transport stream is composed of 188-byte transport packets which are grouped together into HLS chunks or segments. For Microsoft HTTP Smooth Streaming, however, the video and audio elementary streams are grouped into separate data blocks, chunked into file fragments, and indexed with the MP4 or ISO-MBFF "boxes" or "atoms" to hint to the player how to find samples (coded video and audio frames) in these containers.

The sets of video streams may be provided to content server 305 from transcoder element 322. Transcoder element 322 includes a number of transcoder resources 323 where each transcoder resource provides a set of video streams having unique encoding parameters (e.g., a bit rate, a resolution, etc.). Network 315 may include the Internet, various intranets, etc. Network 315 may include wired links and wireless links. It will be understood that the various references made herein to "media" and "video" include both video content and audio content.

Content server 305 includes a set of processors 305 $a$ and a non-transitory computer-readable storage medium (memory) 305 $b$. Memory 305 $b$ may store instructions, which the set of processors 305 $a$ may execute to carry out various embodiments described herein. Content server 305 includes a number of computer devices that share a domain. Content server 305 also includes a schedule module 305 $c$, described in further detail in reference to FIG. 3B.

Figure 3B:
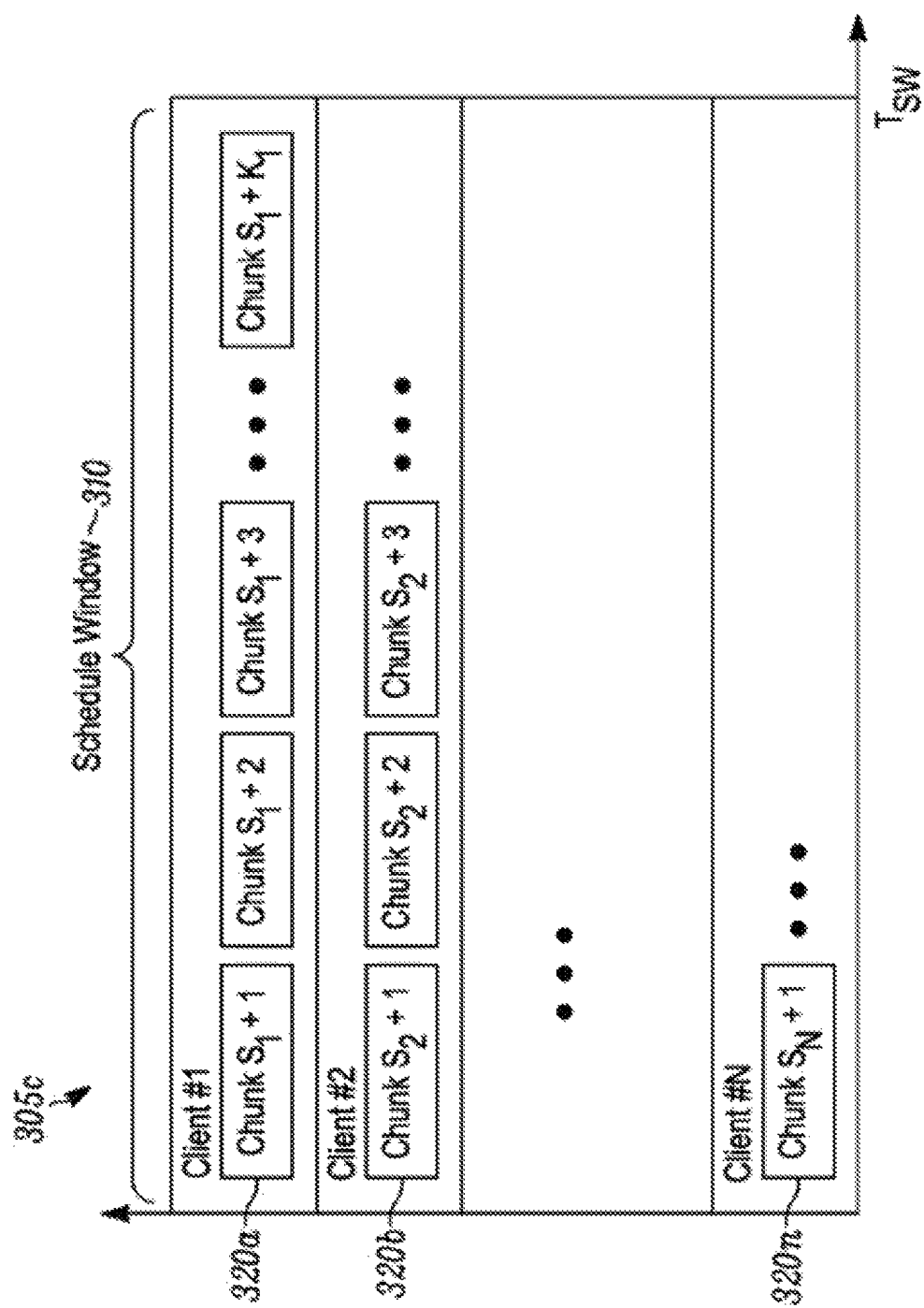
FIG. 3B illustrates an example schedule window provided by a schedule module in accordance with embodiments of the disclosure.

Referring now to FIG. 3B, an example schedule window 310 provided by schedule module 305 $c$ is shown. Ideally, content server 305 maximizes network utilization and maintains comparable video quality levels across the media streams sent to media devices 320. Content server 305 may accomplish this goal in part by utilizing schedule module 305 $c$. Schedule module 305 $c$ may construct and implement schedule window 310 based on one or more factors it receives, determines, or assumes from one or more transcoders, content-management services, content-delivery servers, or media devices in communication with content server 305. In some embodiments, schedule module 305 $c$ uses metadata in the form of Need Vectors corresponding to the transcoded video (which may come from upstream transcoders or content servers) as well as information such as the client's subscription parameters (e.g., service level agreement for the streaming service, e.g., did the client pay for SD or HD service or gold/silver/bronze, etc., which may come from operator-managed content-directory services or fulfillment managers), client device information reported directly from the client media device (screen size, A/V decoder capabilities), etc.

As shown, schedule window 310 includes a plurality of client or media device individual schedules 320. For example, client #1 is assigned schedule 320 $a$, client #2 is assigned schedule 320 $b$, and client #N is assigned schedule 320 $n$. Within each individual schedule 320 is the order of segments to be delivered to the client. For example, client #1 shows that segments chunk $S_1+1$, chunk $S_1+2$, chunk $S_1+3$, . . . , chunk $S_1+K_1$ are to be delivered over the schedule-window time period $T_{SW}$.

As is known, a media-device receive buffer is a necessary component to accommodate network jitter. In other words, timing constraints on the arrival of video data for a media device may be relaxed based on the buffer fullness. For example, if media device has T amount of video data segments in its buffer, the arrival of next video segment can be delayed by $(T-T_{chunk})$ seconds before the media device runs out of media data or underflows. In some embodiments, the player has T seconds of media presentation data in its buffer. If it does not download any new data over the next T seconds, then when T seconds expire, the player's buffer will underflow, and it will stop playing audio and video. In some embodiments, the player must download new segments of $T_{chunk}$ seconds long at a rate that must equal the rate at which video is decoded and rendered, on average, using the $T_{-second\ buffer}$ to absorb delays.

Additionally, the media-device receive buffer also provides the opportunity to relax the timing constraints on segment or chunk downloads without affecting media-device user experience. Thus, a solution that schedules chunks and determines their bitrates for each client for a period of time defined by a schedule window (such as schedule window 310) is desirable. Under the Schedule-Window model, statistical multiplexing may be described as the following: Given a predefined period of time called the Schedule Window with window size $T_{SW}$, and N clients playing different HLS programs, determine optimal rates for each HLS client that maximizes the utilization of network bandwidth while maintaining good video quality for each client.

As indicated in FIG. 3B, the problem for selecting different rates and number of segments for media devices becomes a scheduling problem. In the time period defined as $T_{SW}$, $K_i$ number of chunks are scheduled for media device i. Ki is dependent on the media device status and on the value of the size of the media-device buffer minus the fullness of the media-device buffer, e.g., the available buffer or ($T_{MAX}$-$T_{buffer}$). To select the optimal bitrates for scheduled chunks, content server 305 determines which overall quality level Q will be supported based on network bandwidth.

The media-device status and available buffer may be determined using an HLS client model.

Figure 4:
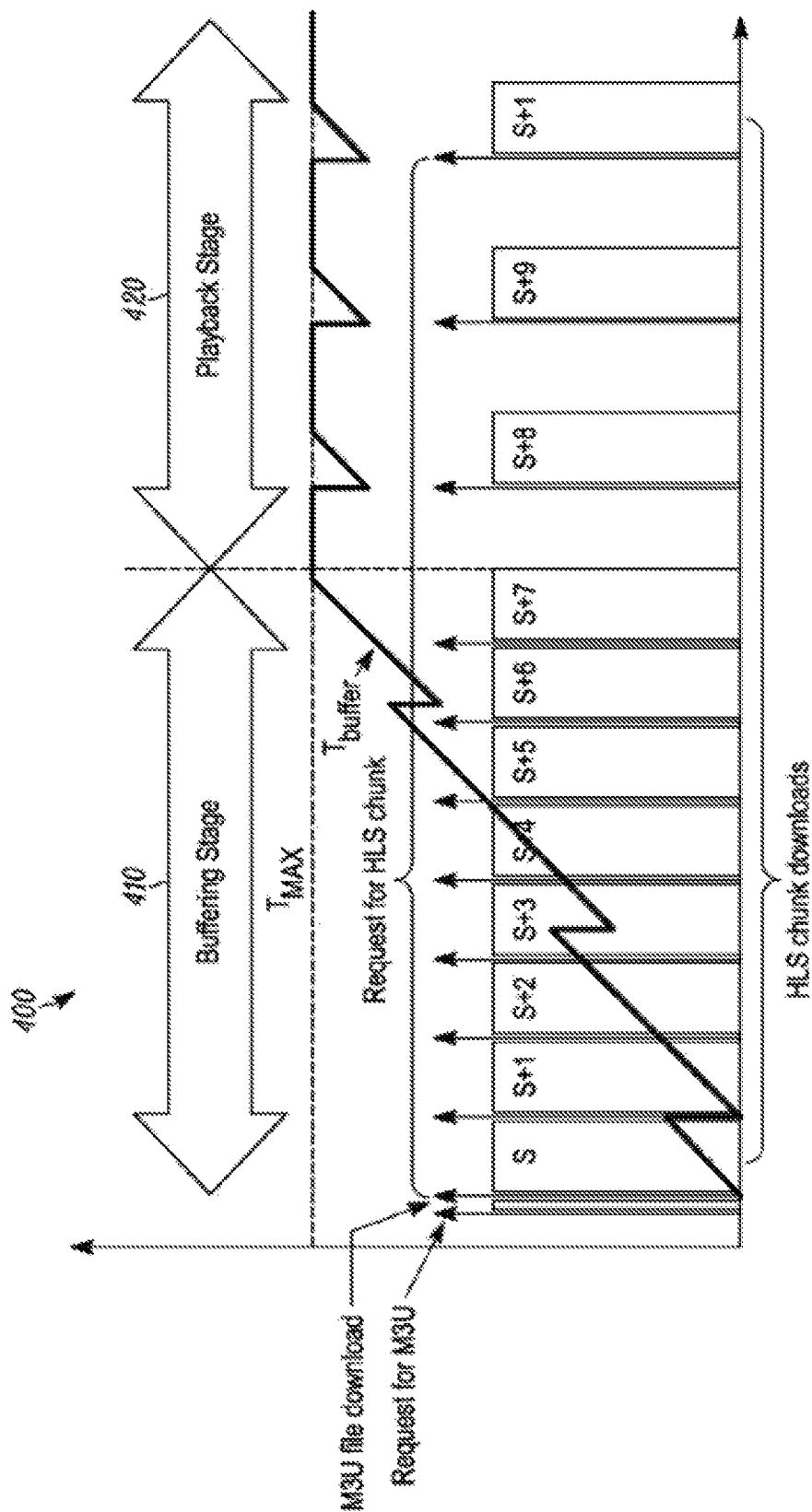
FIG. 4 illustrates an example graph showing a buffering stage and a playback stage for a media-device buffer in accordance with embodiments of the disclosure.

Without wishing to be bound by any particular theory, it has been discovered that HLS client behavior can be characterized and thus is predictable. For example, when the client starts to play a stored HLS program, it first reads a manifest file (playlist file) from an HLS server with specified URI, parses the content of the file, and starts to request HLS chunks sequentially starting with the chunk of lowest sequence number (as described in reference to FIG. 2). Throughout the playing of the HLS program, two playback stages are observed and defined as Buffering stage and Playback stage. FIG. 4 is an example graph 400 showing the two stages: Buffering stage 410 and Playback stage 420. When the client starts, it will be in the Buffering stage 410 with the HLS client buffer empty, and it tries to fill up its HLS Client Buffer by requesting segments or chunks immediately after it finishes downloading the previous chunk. When the client fills up its HLS Client Buffer, it moves into the Playback stage 420. In this stage, the client will fetch one HLS chunk during chunk duration. In other words, the overall download chunk speed matches its real-time playback speed.

Figure 5:
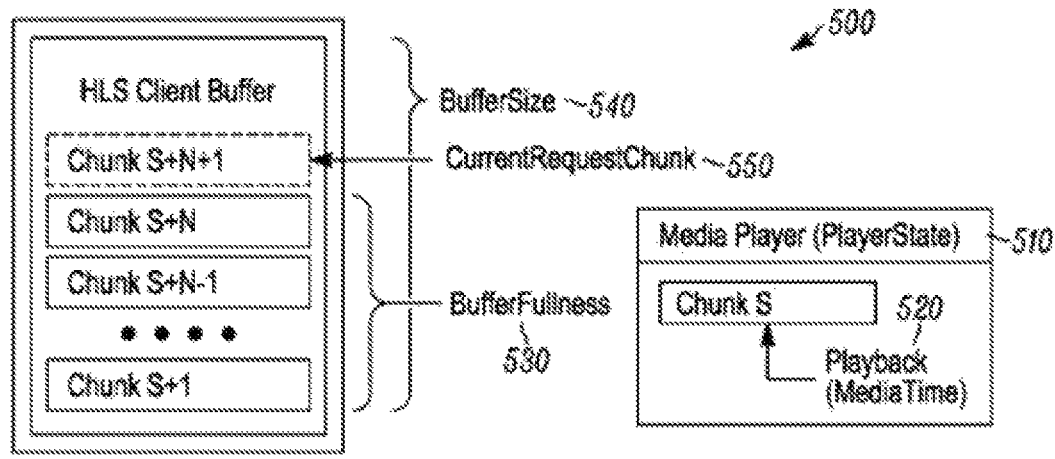
FIG. 5 illustrates an example HLS Client Model ("HCM") block diagram in accordance with embodiments of the disclosure.

To predict the client behavior and learn its status, content server 305 builds a state-based HCM for each client or media device. The HCM provides information on whether a client is in Buffering stage or Playback stage. HCM also offers a means to estimate the fullness level of HLS client buffer. FIG. 5 illustrates an example HCM block diagram 500.

HCM block diagram 500 includes a player state 510. Player state 510 provides the current state of HCM, e.g., play, seek, pause, resume. Also included with player state 510 is media time 520. Media time 520 is the media timestamp of current playing media frame.

HCM block diagram 500 also includes buffer fullness 530, buffer size 540, and current request chunk 550. Buffer fullness 530 is the number of chunks downloaded into HLS client buffer and not yet consumed by the media device. Buffer size 540 is the total size of HLS Client buffer, and current request chunk 550 is the sequence number of current requesting chunk by HLS client.

Referring now to FIGS. 4 and 5, a few variables which are used to construct the HCM are described herein. For example, $T_{start}$ indicates the system time when client finishes downloading the first media chunk and starts to play video. $T_{current}$ indicates the system time when client requests current request chunk 550. $T_{start-pts}$ represents the presentation time stamp ("PTS") of first video frame in the first media chunk. $T_{current-pts}$ represents the PTS of first video frame in current request chunk 550.

Buffer fullness 530 is represented by the filling of the buffer (relative elapsed time) minus the draining of the buffer (actual elapsed time). For example, let $T_{buffer}$ represent Client buffer fullness 530 measured in time. The video data measured in time (seconds) streamed to HCM, $T_{filling}$, can be written as:

$$T_{filling} = T_{current-pts} - T_{start-pts} \quad \text{(Equation 1)}$$

While the video data measured in time (seconds) consumed by HCM, $T_{draining}$, can be written as:

$$T_{draining} = T_{current} - T_{start} \quad \text{(Equation 2)}$$

$T_{buffer}$ can then be calculated as the following:

$$T_{buffer} = T_{filling} - T_{draining} = (T_{current-pts} - T_{start-pts}) - (T_{current} - T_{start}) \quad \text{(Equation 3)}$$

Let $T_{MAX}$ represent the size of HLS client buffer size 540, then HLS client is in Buffering Stage if $T_{buffer} < T_{MAX} - T_{chunk}$, otherwise it operates in normal Playback Stage.

As explained above with reference to FIG. 3, to select the optimal bitrates for scheduled chunks, content server 305 determines which overall quality level Q will be supported based on network bandwidth. To achieve a quality level Q, the encoded bitrate can be calculated based on its NPV.

Figure 6:
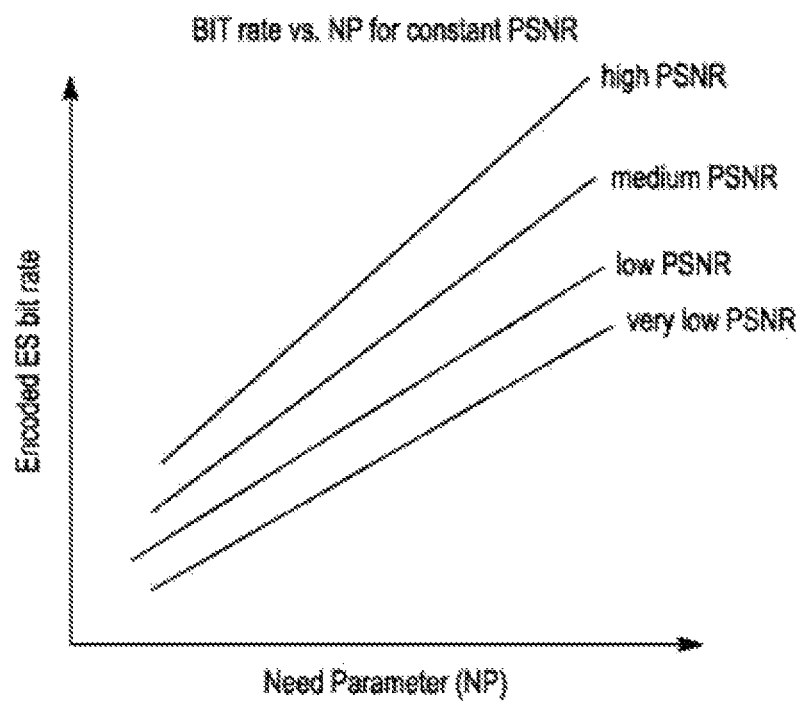
FIG. 6 illustrates an example graph of curves of bit rate vs. Need Parameter Vector ("NPV") in accordance with embodiments of the disclosure.

The NPV is a composite of several factors including Video Complexity ("VC"), Device Profile, Service Priority Level, Codec Profile, etc. VC is derived from video content as an estimation of the complexity level of the video content. Given an NPV, content server 305 calculates what bit rate is needed to obtain a targeted level of quality. This information can be provided by a family of curves of Bit Rate vs. NPV for constant quality, such as shown in FIG. 6. Device Profile can include the screen size, codec profiles (e.g., MPEG2 and AVC for video or Dolby AC-3 or AAC for audio) that are supported, software/hardware/firmware versions, OS versions, player-application version, etc. Service Priority Level can include parameters such as those included in service level agreements such as guaranteed bandwidths supported or access to high definition videos versus standard definition associated with higher and lower cost subscription services, respectively.

NPV can be computed based on complexity of content for each segment, with the curve of Bit Rate vs. NPV being linear for any given quality level. This means if NPV for program A is twice the NPV for program B, it will take program A twice the bit rate as program B to maintain a similar video quality.

An encoded bitrate can be calculated based on its NPV (in bytes per second) as shown in the following equation:

$$byterate(NPV) = \alpha \times NPV \quad \text{(Equation 4)}$$

where α represents the quality level of the encoded video and is a scalar and when normalized it is in the range of 0 to 1. Higher α indicates higher video quality. The total scheduling budget in bytes for a single client over K chunks then is:

$$\text{budget} = \sum_{j=1}^{K} \alpha \times NPV(j) \times T_{chunk} \quad \text{(Equation 5)}$$

For any given budget, content server 305 may determine a for a single client, thus the achievable video quality under the given budget. Next, content server 305 expands the computation of a over multiple HLS clients. In order to maintain comparable quality for each HLS client, the same a value may be selected. Therefore, the total bytes for all clients during the scheduling window ("SW") can be calculated as:

$$SUM_{bytes} = \sum_{i=1}^{N}\sum_{j=1}^{K_i} byterate(i,j) \times T_{chunk} \quad \text{(Equation 6)}$$

$$= \sum_{i=1}^{N}\sum_{j=1}^{K_i} \alpha \times NPV(i,j) \times T_{chunk}$$

where N is the number of HLS clients, Si is the sequence number of last downloaded chunk for client i, and $K_i$ is the number of chunks scheduled for HLS client i. For simplification, all chunks may be assumed to have the same duration $T_{chunk}$.

For a fixed-rate channel, the total available network bandwidth is defined as "BW" in bytes/second. So the total budget for all HLS clients is $BW \times T_{SW}$. Therefore, in order to send $SUM_{bytes}$ during SW with window size defined as $T_{SW}$, it must satisfy the equation below:

$$SUM_{bytes} \leq BW \times T_{SW} \quad \text{(Equation 7)}$$

With the known NPV values for scheduled chunks, content server 305 can calculate a as follows:

$$SUM_{bytes} = \sum_{i=1}^{N}\sum_{j=1}^{K_i} \alpha \times NPV(i,j) \times T_{chunk} \leq BW \times T_{SW} \quad \text{(Equation 8)}$$

then $$\alpha \leq \frac{BW \times T_{SW}}{T_{chunk} \times \sum_{i=1}^{N}\sum_{j=1}^{K_i} NPV(i,j)} \quad \text{(Equation 9)}$$

While not wishing to be bound by any particular theory, it has been discovered that when a media device or client is in normal Playback Stage, it will only try to download $T_{SW}/T_{chunk}$ number of chunks. However, during its initial Pre-Buffering Stage, it will try to download as many chunks as possible until its client buffer is full. To determine the number of chunks for a client during SW, it is important to estimate client buffer fullness and figure out the number of chunks to download during SW. To estimate the client buffer fullness, content server 305 utilizes Equation 3. Based on the value of $T_{buffer}$, K (e.g., scheduled number of chunks to download) is determined according to:

$$K=(T_{SW}+\beta \times (T_{MAX}-T_{buffer}))/T_{chunk} \quad \text{(Equation 10)}$$

where β is the weight factor for buffering stage. The larger β indicates shorter time for filling up client buffer, thus shorter buffering stage.

With the known NPV values and scheduled number of chunks for each client, content server 305 determines a with Equation 9 and determines the achievable optimal quality for all HLS clients. Subsequently, content server 305 selects the bitrate for scheduled chunk that is closest to α×NPV.

Figure 7:
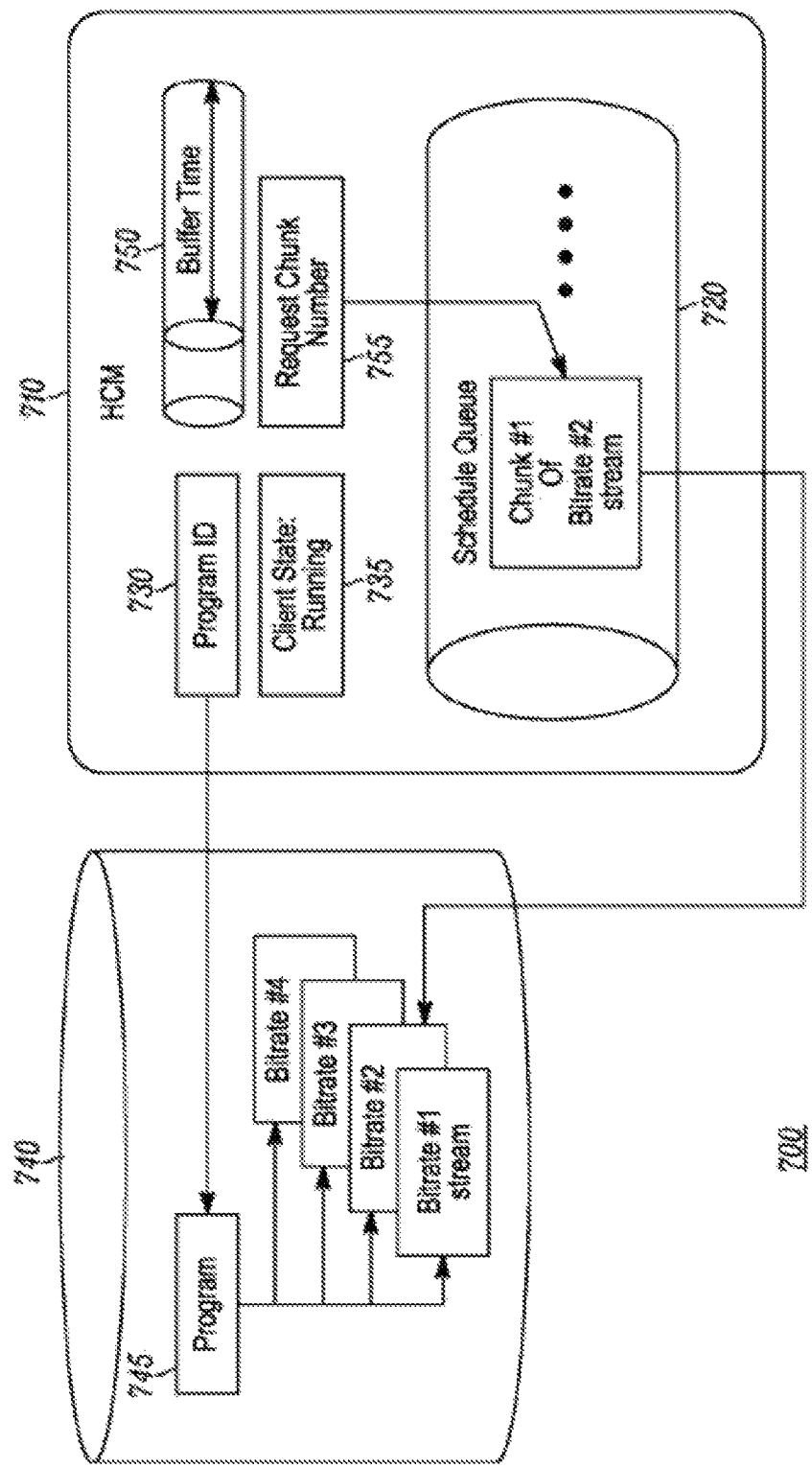
FIG. 7 illustrates an example block diagram of a system implementing an HCM and schedule queue in accordance with embodiments of the disclosure.

FIG. 7 is an example block diagram of a system 700 implementing an HCM 710 and schedule queue 720. In some embodiments, HCM 710 indicates a program ID 730 (e.g., what show it is requesting) and the corresponding program 745 in the content server 740. HCM 710 tracks the associated HLS client state 735 (e.g., running, seeking, pausing, resuming, etc.). HCM 710 also estimates the buffer time 750 for its associated HLS client. In some embodiments, schedule queue 720 stores the latest schedule results from schedule window (not shown) and maintains a pointer to a current serving chunk number or request chunk number 755.

In some embodiments, a client (e.g., associated with HCM 710) will request a program 745 from content server 305. Rather than allow the client to select the bit rate at which the client receives the program content, the content server 305 publishes a single available bit rate for the client to receive. Thus, in FIG. 7, the schedule queue 720 indicates that the client will only receive chunk #1 of bitrate #2 stream for that particular segment request. As content server 305 determines a different assignment for a particular client, the schedule queue 720 reflects the assignment change almost immediately, e.g., with little or no delay. In some embodiments, the assignment from content server 305 may change from segment to segment. In some embodiments, this flexibility in changing the bit rate the client receives can prevent or minimize the number of segments that a client would re-buffer.

Still referring to FIG. 7, in addition to normal playback operations, the HLS client may also perform some common operations which can affect the scheduling decisions. For example, the HLS client may switch to different video content (e.g., channel change). The HLS client may pause the content and after a while resume the playback. The HLS client may seek to a specific position and start to watch from the new position. The HLS client may complete playback and leave. All these client events indicate a transition period, requiring a modification to the bandwidth assigned to the HLS client.

As used herein, a channel change is when the same client asks for program different from the program it is currently playing. Pause and Resume is when the client does not request any chunk download for a prolonged period of time. However, it then requests the chunk with sequence number following the chunk it downloads before the prolonged period of time. Seek is when a client is requesting a chunk with a sequence number not following the previous chunk it downloads. Complete is when a client downloads the last chunk of a program.

In some embodiments, additional refinements in the form of an adjustment factor may be used for assigning bandwidth to clients. For example, for certain video programs, they may not offer multiple streams with the dynamic range of bit rates that satisfy α×NP ⊂ {bitrate}. In this case, content server 305 must handle cases for either over budget or under budget bit-rate assignments. As used herein, over budget is when the calculated α×NP is much lower than the available lowest bitrate (e.g., the bit rate of a chunk is greater than the allocated bandwidth for the client). Similarly, under budget is when the calculated α×NP is much higher than the available higher bitrate (e.g., the bit rate of a chunk is less than the allocated bandwidth for a client).

In some embodiments, content server 305 may remove either under budget or over budget client out of the Equation 6. For example, assuming Client P is over/under budget, the budget for Client P is calculated as:

$$\text{budget }(P) = \sum_{i=1}^{K_P} ChunkSize_{lowest/highest}(i) \quad \text{(Equation 11)}$$

and $$SUM_{bytes} = \quad \text{(Equation 12)}$$
$$\sum_{i=1, i \neq P}^{N} \sum_{j=1}^{K_i} \alpha \times NPV(i,j) \times T_{chunk} \leq (BW \times T_{SW} - \text{budget }(P))$$

In some embodiments, if the bit streams are pre-encoded and stored, then it may happen that the available bit rates are over or under budget. In this case, a transcoder may be used to generate the bit streams close to α×NPV. Content server 305 can work closely with the transcoder by computing and adjusting the transcoder's output bitrate as α×NPV at each chunk interval.

As provided above, a transition period occurs when a client playback approaches the end of program. This is because when client playback approaches the end of the program (e.g., the number of available chunks to schedule is smaller than K), there may not be enough chunks for downloading to fill the schedule window. In this case, Equation 13 may be used to compensate for the gap in the schedule window.

In Equation 13, M represents the number of total remaining chunks for download, and K represents the number of scheduling chunks for Schedule Window. In this case, M<K. To assure scheduled chunks arrive at client in time, a modification is made for Equation 5. Instead of using sum of NPVs of M chunks, content server 305 determines the sum as follows:

$$\frac{K}{M} \times \sum_{i=1}^{M} NPV(i) \quad \text{(Equation 13)}$$

This assigns a higher bitrate to the client such that it completes the download of M<K chunks in less than the $T_{SW}$ schedule window time. The client may terminate the session at this time which triggers the calculation of a new Schedule Window applied to the remaining clients communicating with the content server.

Additionally, in some embodiments, a network bottleneck issue on the client end may occur. This may occur when the end network on client side (e.g., 802.11g/n Wi-Fi home network) significantly slows down, and its bandwidth drops below the scheduled bit rate. To address this issue, a history of download rate of previous HLS chunks can be stored. Thus, in some embodiments, the content server 305 checks if a client's previous download rate is higher than the scheduled weighted network bandwidth before sending the chunk requested by HLS client. If not, a new lower rate is calculated based on previous download rate history and HLS client information.

Moreover in some embodiment, the assumption can be made that all users in the service group can reliably download the video chunks assigned by the server, within a scheduled time window so as not to underrun their playback buffers. However, it can occur that a video client's WiFi bandwidth does not support the continuous download of the assigned chunk sequence. That is, the Bandwidth associated with or available to a user's home network device(s), can be less than required by to sustain a continuous video delivery at a given performance level. In this such a case, the system 800 would benefit if the server could detect the client bandwidth deficiencies and appropriately adjust a user's delivered video chunk sequence bitrate to fit the WiFi bandwidth available to that client. The bandwidth measurement can be accomplished by the server using various TCP or HTTP throughput analysis techniques, as described in United States Patent Application No. 9769235, Issued Sep. 19, 2017 and U.S. patent Ser. No. 14/991,091, filed Jan. 8, 2016 the complete contents of each of which are hereby incorporated herein by reference and/or using any known, convenient and/or desired bandwidth measurement technique(s).

If the server detects that the throughput or measured bandwidth to a client is not sufficient to meet the chunk deliveries assigned in the latest schedule window by the server, the server may clamp that client's video bitrate to a value that meets the measured bandwidth and then the schedule window can be recalculated accounting for the user's new bitrate schedule. For example, if the server calculates the bytes to be sent to the client P in the managed video service group during the schedule window as budget (P) and measures client P's bandwidth as BWP bits/sec, then the schedule will not be met for P if the following equation is violated:

$$\text{budget }(P) = \sum_{i=1}^{K_P} \alpha \times NPV(i) \times T_{SW} \leq \frac{BW_P \times T_{SW}}{8} \quad \text{(Equation 14)}$$

where KP is the number of chunks for P during the TSW second schedule window and the bytes to be pulled by P during the window is α×NPV(i) bytes per second per chunk based on the video quality scale factor α and the Need Parameter Vector for each chunk, NPV(i). During the time for which the measured bandwidth violates Equation 14, the server can assign a fixed variant bit rate for client P that allows its download schedule to be met and recalculate the bytes to be sent to the remaining clients such that the remaining schedule window criteria are met, by subtracting out the bytes rescheduled for client P as in Equation 15:

$$SUM_{bytes} = \sum_{i=1, i \neq P}^{N} \sum_{j=1}^{K_i} \alpha \times NPV(i,j) \times T_{chunk} \leq \quad \text{(equation 15)}$$
$$(BW \times T_{SW} - chunksize(P,j) \times T_{chunk})$$

where Ki is the number of chunks to be sent to client i, Tchunk is the chunk duration in seconds, and chunksize(P,j) is the size in bytes of client P's j-th chunk of the constrained video bitrate variant.

The schedule window can be recalculated when the disadvantaged client's WiFi bandwidth improves, as detected by the server's measurement of the client bandwidth, such that Equation 14 is met. This schedule window calculation can then be based on the NPV's for that client's requested video asset.

Figure 8:
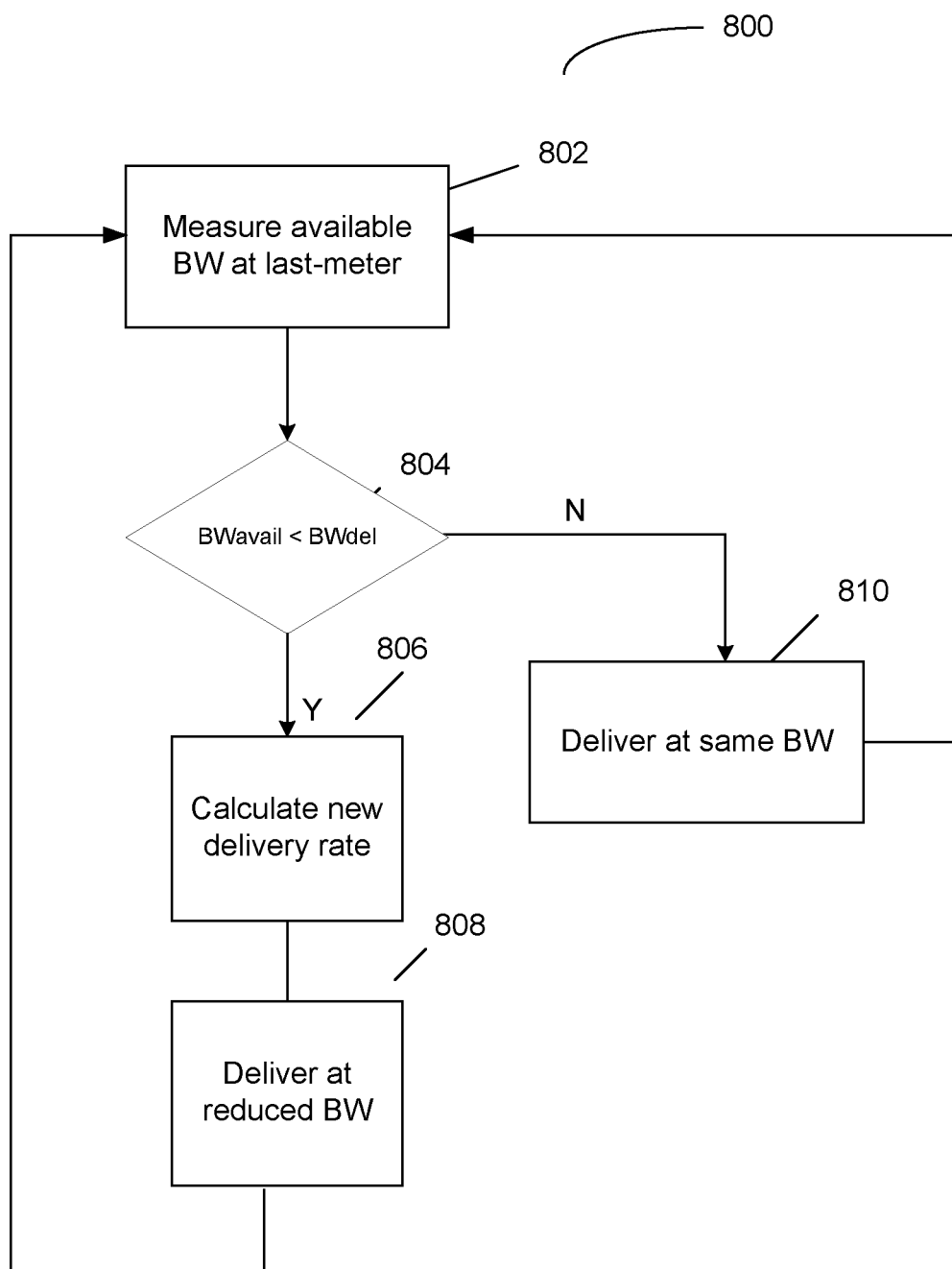
FIG. 8 illustrates an embodiment of a system for measuring bandwidth of a user's home network devices.

FIG. 8 depicts an embodiment of a system 800 for measuring bandwidth of a user's home network devices, comparing the available bandwidth ($BW_{avail.}$, defined by the right-side of equation 14) to the bandwidth requirement of the delivered content ($BW_{del}$, defined by the left-side of equation 14) and selectively delivering the content at the same or new bitrate based on the user's available bandwidth.

In step 802, a measurement can be performed on a user's home network device(s) to determine the bandwidth available ($BW_{avail}$) and that measure can be compared with the measure of the bandwidth requirement of the delivered content (BM/de) in step 804. If it is determined in step 804 that the bandwidth requirement of the delivered content ($BW_{del}$) exceeds the bandwidth available on a user's home network device(s) ($BW_{avail}$) then the system can proceed to step 806 and calculate a new delivery rate for the content in step 806 and begin delivering content at the newly calculated delivery rate in step 808. However, if in step 804 it is determined that the bandwidth available on a user's home network device(s) ($BW_{avail}$) is equal to or exceeds the bandwidth requirement of the delivered content ($BW_{del}$), then the system 800 can continue with delivery of the content at the same bitrate 810. In some embodiments the calculation of the available bandwidth may be determined only partially based upon a user's home network device(s).

The scheduling algorithm described herein can assign video chunks to clients at bitrates determined to meet their video quality and need vector criteria. Frequently, there is some, typically small, amount of bandwidth that is not fully allocated during the schedule window. In some embodiments it is desirable to have a method for allowing some of this bandwidth be reclaimed for Internet data or giving the bandwidth to clients that can benefit the most in terms of a gain in video quality, e.g., as determined by Peak-signal-to-noise-ratio (PSNR).

Figure 9:
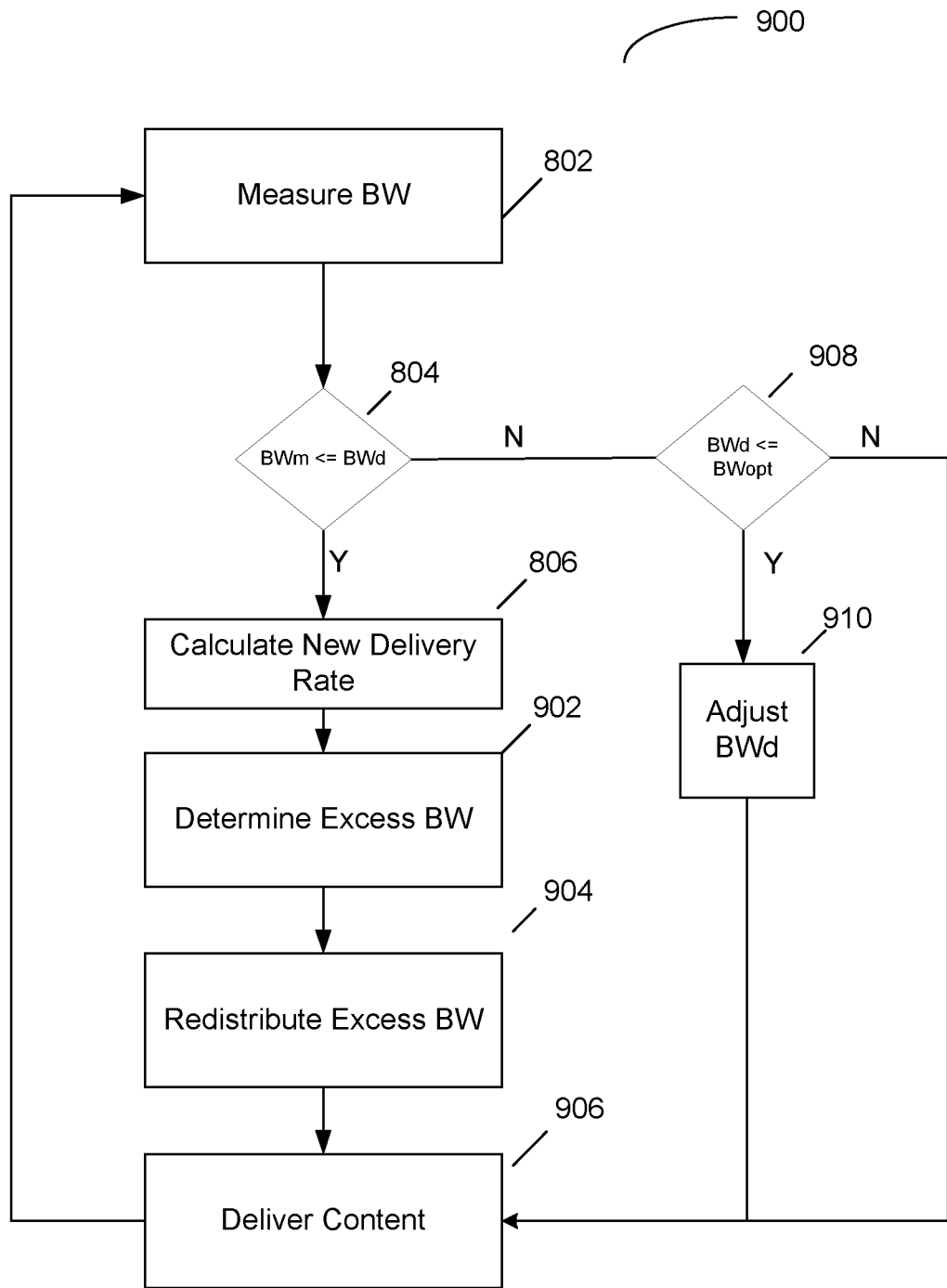
FIG. 9 depicts an embodiment of a system for measuring bandwidth of a user's home network devices and reallocating excess bandwidth to other clients.

FIG. 9 depicts an embodiment of a system 900 for measuring bandwidth of a user's home network devices, comparing the available bandwidth ($BW_{avail.}$, defined by the right-side of equation 14) to the bandwidth requirement of the delivered content ($BW_{del}$, defined by the left-side of equation 14), selectively delivering the content at the same or new bitrate based on the user's available bandwidth and redistributing any excess bandwidth.

In the embodiment depicted in FIG. 9, in step 802, a measurement can be performed on a user's home network device(s) to determine the bandwidth available ($BW_{avail}$) and that measure can be compared with the measure of the bandwidth requirement of the delivered content ($BW_{del}$) in step 804. If it is determined in step 804 that the bandwidth requirement of the delivered content ($BW_{del}$) exceeds the bandwidth available on a user's home network device(s) ($BW_{avail}$), then the system 900 can proceed to step 806 and determine a new delivery rate for the content in step 806 and in step 902 the system 900 can determine an excess bandwidth available due to the reduced bandwidth determined in step 806. Then, in step 904 excess bandwidth can be redistributed or reassigned to different clients and content can be delivered to client in step 906.

In some embodiments the redistribution/reassignment of excess bandwidth can be based on a determination of which alternate clients may benefit most by allocation of additional bandwidth according to the detailed description provided herein. However, in alternate embodiments, excess bandwidth can be assigned and/or redistributed according to any known, convenient and/or desired redistribution system or method.

However, if in step 804 it is determined that the bandwidth available on a user's home network device(s) ($BW_{avail}$) is equal to or exceeds the bandwidth requirement of the delivered content ($BW_{del}$), then the system 900 can evaluate the bandwidth requirement of the delivered content ($BW_{del}$) as compared to a prescribed optimal bandwidth for delivery of the content ($BW_{opt}$) in step 908. If the bandwidth requirement of the content delivery ($BW_{del}$) is less than the optimal bandwidth for delivery of the content ($BW_{opt}$), then the system can proceed to step 910 and the system 900 can adjust the bandwidth delivered ($BW_{del}$) based at least in part on the available bandwidth ($BW_{avail}$) and the optimal bandwidth ($BW_{opt}$). Otherwise the system 900 can proceed from step 908 to step 906 and deliver the content.

Figure 10:
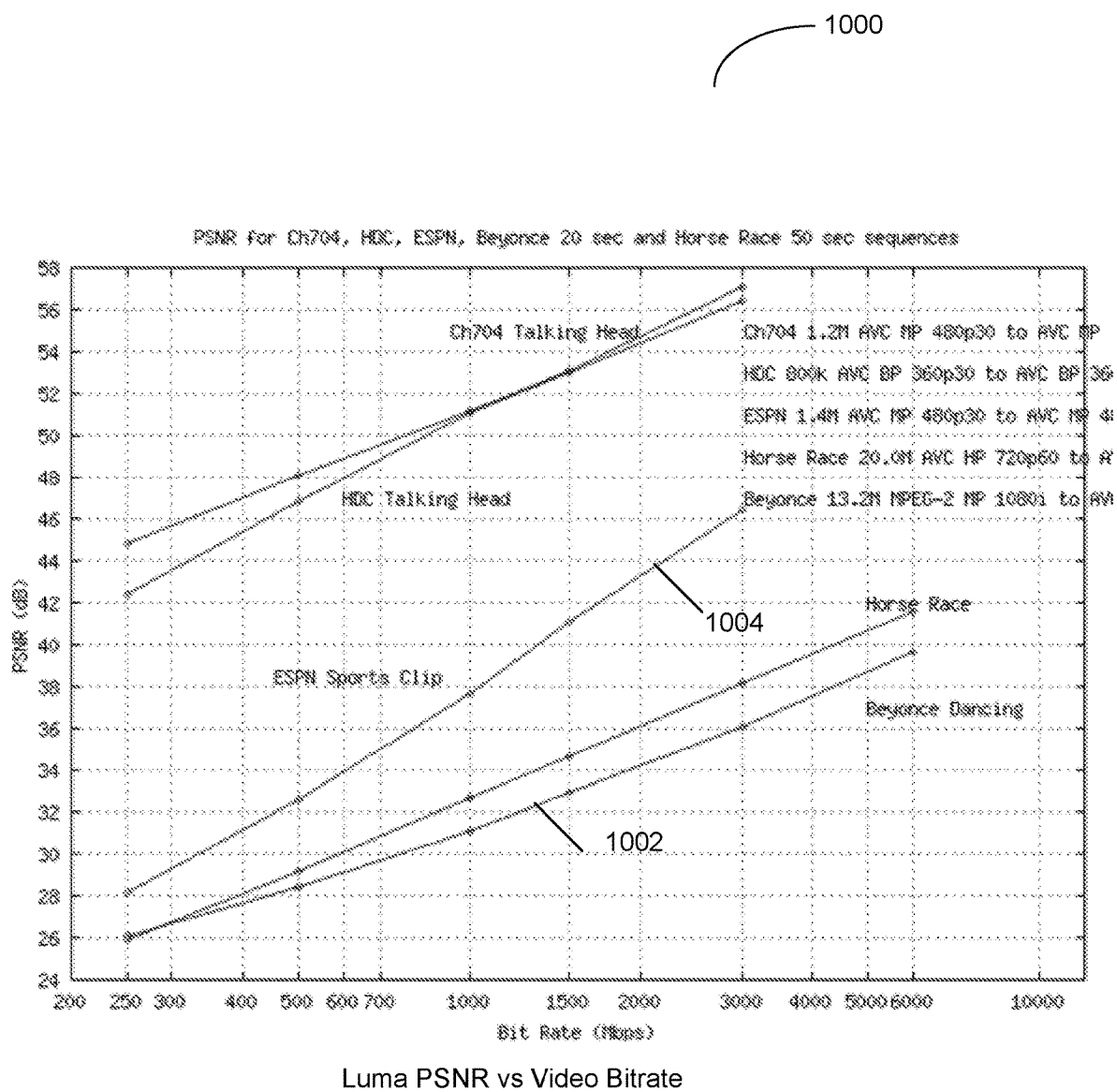
FIGS. 10 and 11 illustrate an application of a bandwidth reallocation system to various content feeds.
Figure 11:
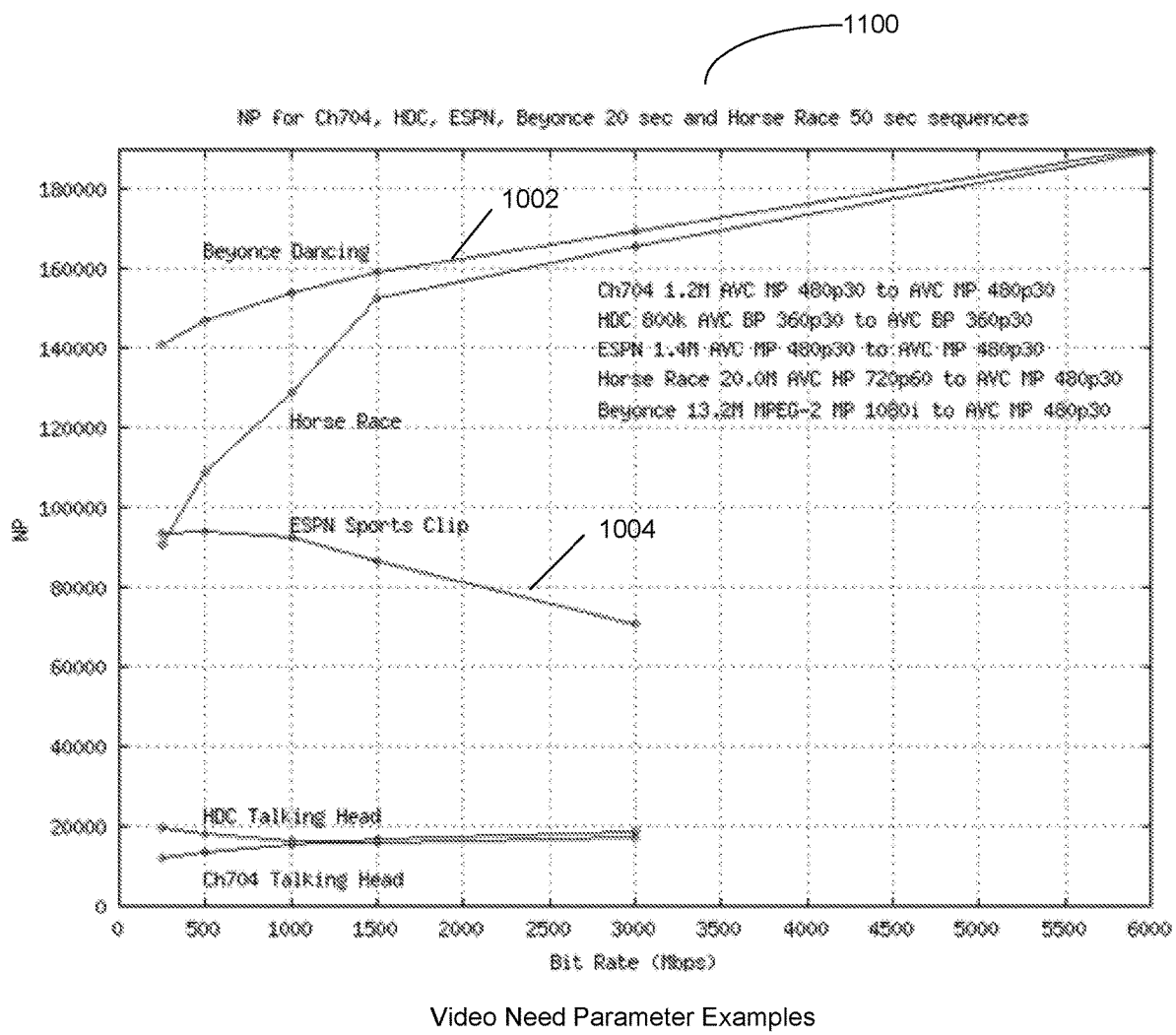

In some embodiments the determination of how to redistribute/reallocate excess bandwidth determined in step 902 can be determined based on the method described in relation to FIGS. 10 and 11. However, in alternate embodiments, excess bandwidth can be assigned and/or redistributed according to any known, convenient and/or desired redistribution system or method.

FIG. 10 depicts a log-log plot of video luma PSNR versus video bitrate 1000. PSNR is given in deciBels as $$PSNR_{dB} = 10\log_{10}\left(\frac{255^2}{MSE^2}\right) \quad \text{(Equation 16)}$$

where MSE is the mean-square luma pixel error between the decoded picture and original source picture. PSNR is often performed and reported by averaging over a series of pictures in a video sequence. As shown in FIG. 10, the PSNR vs bitrate, R, plots are nearly linear on the log-log graph. Indeed, the "Beyonce Dancing" plot 1002 is well approximated by $$PSNR_{dB,Beyonce}=11.12 \cdot \log_{10}(R)-2.01 \quad \text{(Equation 17)}$$

while the PSNR plot for "ESPN Sports Clip" 1004 is well approximated by:

$$PSNR_{dB,ESPN}=17.48 \cdot \log_{10}(R)-14.57 \quad \text{(Equation 18)}$$

In FIG. 10, the higher slope for the ESPN linear approximation 1004 is evident. This indicates that the ESPN video sequence will benefit more in terms of SNR gain from a given increase in video bitrate, R.

By way of non-limiting example, the video Need Parameters for the clips of FIG. 10 are shown in FIG. 11 where it is seen that the low resolution ESPN sports clip 1004 has smaller need parameter than the complex 1080i Beyonce clip 1002. The SABR scheduling algorithm likely would assign smaller bit rates to the ESPN clip 1004 than Beyonce dancing clip 1002 as a result. As an example of reapportioning any excess bandwidth based on PSNR gain, by way of non-limiting example, one can assume that the ESPN clip 1004 had been assigned 500 kbps and the Beyonce dancing clip 1002 had been assigned 1.5 Mbps such that both would experience video quality of about 33 dB. As shown in the plot 1000 of FIG. 10, if the schedule window algorithm had an extra 500 kbps of excess video bandwidth available then increasing the bandwidth allocated to the ESPN clip 1004 from 500 to 1000 kbps would give it a PSNR of 38 dB for a 5 dB PSNR gain, while conversely assigning the same excess video bandwidth of 500 kbps to the Beyonce dancing clip 1002 would result in the Beyonce dancing clip 1002 going from 1500 to 2000 kbps would result in a PSNR of 34 dB or only a 2 dB gain.

This prioritization can be conditioned in many ways. For example, it can be disabled or not applied to a sequence that has high log-log PSNR-bitrate slope, if the video quality scale factor, α, is set for high range or equivalently, not applied to streams whose current bitrates result in PSNRs>40 dB which is deemed as excellent video quality.

Figure 12:
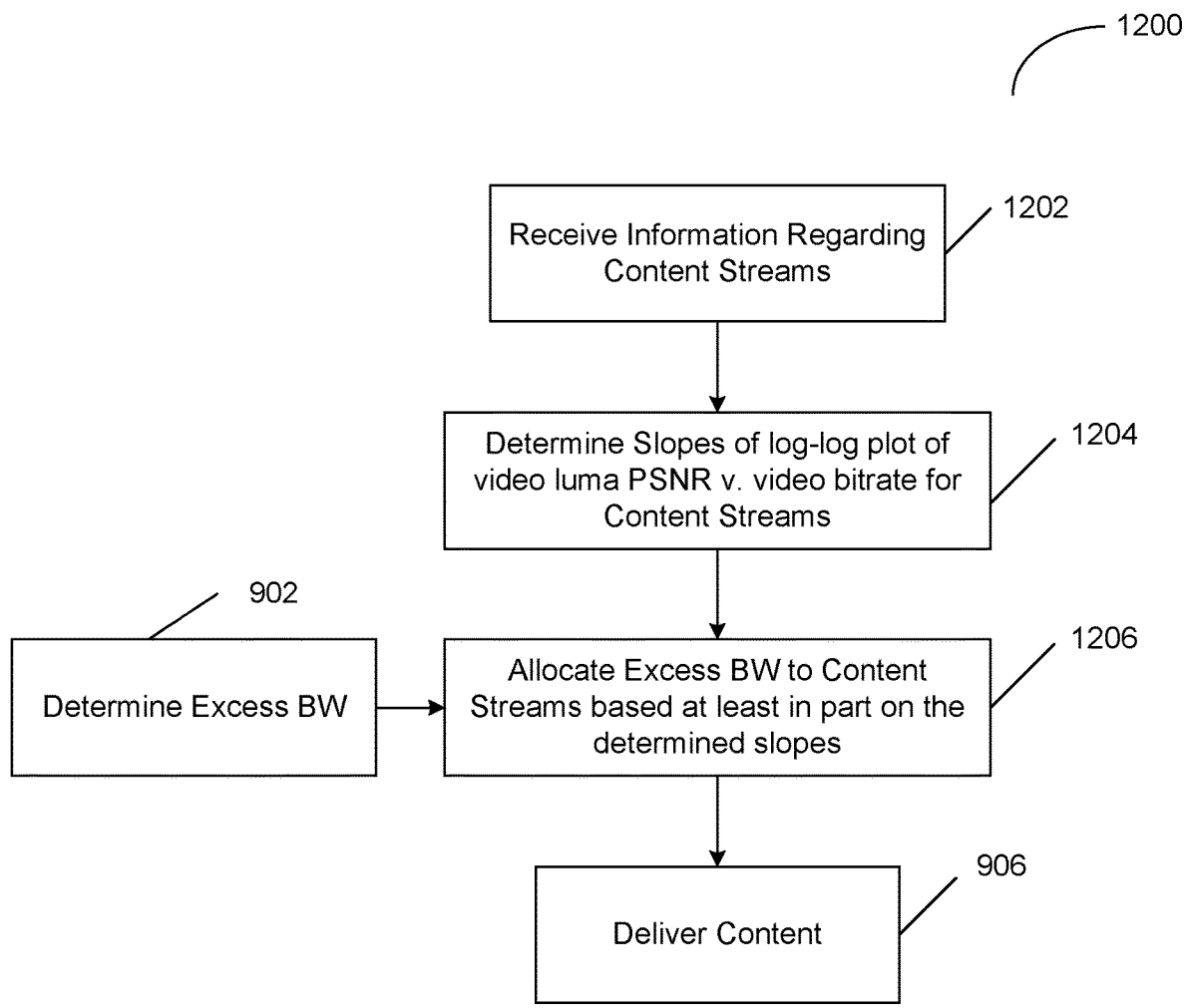
FIG. 12 illustrates an embodiment of a system for allocation of excess bandwidth.

FIG. 12 depicts an embodiment of a system for allocation of excess bandwidth 1200, which in some embodiments can be implemented in step 904 of FIG. 9. In the embodiment depicted in FIG. 12, in step 902 excess bandwidth can be calculated. In step 1202, information related to the content streams associated with various clients can be received. Such information can include information sufficient to determine the slopes of the plot of the video luma PSNR vs. video bitrate for the content streams. In step 1204, the slopes of the video luma PSNR vs. video bitrate for each content stream can be determined. In step 1206, excess bandwidth determined in step 902 can be redistributed to the various content streams based, at least in part, on the slopes determined in step 1204. Then in step 906 content can be delivered using the new bitrates determined in step 1206

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

What is claimed:

1. A method comprising:
    measuring a bandwidth constraint associated with users' home network devices;
    determining, by a server, bandwidth to allocate to each of a plurality of media devices configured to provide video content using a HyperText Transfer Protocol-based live streaming client model ("HCM") and a bitrate based on said measured bandwidth constraint associated with said users' home network devices, and based at least in part on a corresponding need parameter vector ("NPV"), the allocated bandwidth determined based on measured rates at which video luma Peak Signal to noise Ratio (PSNR) changes as a function of video bitrate for content delivered to each respective active media device, and the NPV varied by a scalar quality value for each of the plurality of media devices; and
    providing the determined bandwidth to allocate to each of the plurality of media devices; wherein the video content is transmitted in a plurality of segments from the server; and
    wherein each segment is transmitted using a variable bitrate from segment to segment.

2. The method of claim 1 wherein the server constructs a state-based HCM for each of the plurality of media devices.

3. The method of claim 2 wherein the HCM provides if a media device is in a buffering state or playback state.

4. The method of claim 2 wherein the HCM provides an estimate of a fullness of a media-device buffer.

5. The method of claim 2 wherein the determined bandwidth to allocate to each of the plurality of media devices prevents a media device from buffering content already received from the server.

6. The method of claim 1 wherein the server or a proxy constructs a NPV for each of the plurality of media devices.

7. The method of claim 6 wherein the NPV is based on one or more of the following: video complexity, device profile, service priority level, and codec profile.

8. The method of claim 7 wherein the video complexity is derived from video content as an estimation of complexity of the video content.

9. The method of claim 6 wherein the NPV is computed based on a complexity of video content for each segment.

10. The method of claim 6 wherein the NPV has a linear relationship with the bitrate for a given segment.

11. The method of claim 1 further comprising:
    transmitting the video content from the server to one or more media devices at a bit rate that is within the confines of the determined bandwidth to allocate for each media device.

12. A method for providing video content using a HyperText Transfer Protocol-based live streaming client model ("HCM"), the method comprising:
    determining a bandwidth to allocate to a plurality of media devices using the HCM;
    determining bandwidth constraints associated with each of said plurality of media devices;
    determining a number of active media devices associated with the plurality of media devices to allocate the determined bandwidth;
    determining a need parameter vector ("NPV") for each of the active media devices, the NPV bandwidth determined based on measured rates at which video luma Peak Signal to noise Ratio (PSNR) changes as a function of video bitrate for content delivered to each respective active media device; and
    assigning a fraction of the bandwidth to each of the active media devices based, at least in part, on said bandwidth constraints associated with each of said plurality of media devices and on the NPV varied by a scalar quality value for each of the active media devices.

13. The method of claim 12 wherein the NPV is based or one or more of the following: video complexity, device profile, service priority level, and codec profile.

14. The method of claim 13 wherein video complexity is derived from video content as an estimation of a complexity of the video content.

15. The method of claim 12 wherein the NPV is computed based on a complexity of video content for each segment.

16. The method of claim 13 wherein the NPV is based on device profile.

17. The method of claim 16 wherein the device profile indicates that an active device is undergoing a transition period requiring a modification to the bandwidth assigned to the active device.

18. The method of claim 17 wherein the transition period is one or more of the following: a channel change, a pause or resume, a seek, a complete, and a join.

19. The method of claim 12 further comprising:
    determining an adjustment factor for assigning the fraction of the total bandwidth to each active media device.

20. The method of claim 19 wherein the adjustment factor is based on or more of the following:
    the NPV for an active media device is over budget, the NPV for an active media device is under budget, an active media device completes playback, and a bottleneck occurs at the active media device.

* * * * *